United States Patent
Pitchenik et al.

(10) Patent No.: US 6,397,328 B1
(45) Date of Patent: *May 28, 2002

(54) METHOD FOR VERIFYING THE EXPECTED POSTAGE SECURITY DEVICE AND AN AUTHORIZED HOST SYSTEM

(75) Inventors: David E. Pitchenik, Fairfield; Frederick W. Ryan, Jr., Oxford, both of CT (US)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/754,569

(22) Filed: Nov. 21, 1996

(51) Int. Cl.⁷ .................................................. H04L 9/00
(52) U.S. Cl. ........................ 713/155; 713/200; 713/168; 380/30; 380/259; 380/286; 705/60; 705/61; 705/62; 705/63
(58) Field of Search .............................. 380/21, 23, 25, 380/51, 259, 268, 282, 286, 30; 705/401, 403, 404, 405, 60–63; 713/200, 155, 168

(56) References Cited

U.S. PATENT DOCUMENTS

| | | | |
|---|---|---|---|
| 4,802,218 A | 1/1989 | Wright et al. | 380/23 |
| 4,845,632 A | 7/1989 | Kroll et al. | 364/464.02 |
| 4,958,291 A | 9/1990 | Mamone et al. | 364/464.02 |
| 5,299,263 A | 3/1994 | Beller et al. | 380/30 |
| 5,319,562 A | 6/1994 | Whitehouse | 364/464.03 |
| 5,491,750 A | 2/1996 | Bellare et al. | 380/21 |
| 5,510,992 A | 4/1996 | Kara | 364/464.02 |
| 5,606,613 A * | 2/1997 | Lee et al. | 380/21 |

(List continued on next page.)

FOREIGN PATENT DOCUMENTS

| | | | |
|---|---|---|---|
| EP | 0 388 843 A2 | 3/1990 | G07B/17/04 |
| EP | 0 661 884 A2 | 12/1994 | H04N/7/26 |
| EP | 0 845 762 A2 * | 6/1998 | G07B/17/00 |
| EP | 0 298 776 A2 | 7/1998 | G07B/17/02 |

OTHER PUBLICATIONS

Schneier, Applied Cryptography, 2nd edition, p. 37, basic protocol under the section "Signing Documents with Public–Key Cryptography.", Oct. 1995.*

Menezes et al., Handbook of Applied Cryptography, CRC Press, pp. 560–561, 1997.*

United States Postal Service draft of "Information Based Indicia Program Host System Specification" dated Oct. 9, 1996.

*Primary Examiner*—Albert Decady
*Assistant Examiner*—Paul Callahan
(74) *Attorney, Agent, or Firm*—Alberta A. Vitale; Michael E. Melton; Charles R. Malandra, Jr.

(57) ABSTRACT

A method for verifying that the expected components of a postage metering system includes alternate embodiments for verifying a PSD coupled to a host system is the expected PSD. The method further includes verifying the host system as the expected host system. A first message is encrypted in the PSD using a first cryptographic key to obtain a first encrypted message. The first encrypted message is sent to the host system which decrypts the first encrypted message using a second cryptographic key. The host system then encrypts a second message derived from the decrypted first encrypted message using the second cryptographic key. The host system then sends the encrypted second message to the PSD which decrypts the second encrypted message in the PSD using the first cryptographic key. The PSD compares the decrypted second encrypted message with the first message, and activates the PSD for processing transactions requested by the host system when the decrypted second encrypted message corresponds to the first message.

12 Claims, 6 Drawing Sheets

U.S. PATENT DOCUMENTS

| | | | |
|---|---|---|---|
| 5,612,889 A | * 3/1997 | Pintsov et al. | 364/478.14 |
| 5,625,694 A | 4/1997 | Lee et al. | 380/23 |
| 5,655,024 A | 8/1997 | Bell et al. | 380/51 |
| 5,666,284 A | 9/1997 | Kara | 705/402 |
| 5,708,712 A | 1/1998 | Brinkmeyer et al. | 380/23 |
| 5,742,683 A | 4/1998 | Lee et al. | 380/23 |
| 5,745,576 A | * 4/1998 | Abraham et al. | 380/25 |
| 5,774,550 A | 6/1998 | Brinkmeyer et al. | 380/21 |
| 5,805,711 A | * 9/1998 | Windel et al. | 380/55 |
| 5,850,444 A | 12/1998 | Rune | 380/21 |

* cited by examiner

METHOD FOR VERIFYING THE EXPECTED POSTAGE SECURITY DEVICE AND AN AUTHORIZED HOST SYSTEM

RELATED APPLICATIONS

The present application is related to the following U.S. patent applications Ser. Nos. 08/754,570, 08/754,568 and 08/754,578, each filed concurrently herewith, and assigned to the assignee of the present invention.

FIELD OF THE INVENTION

The present invention relates generally to a system and method for postage metering security and, more particularly, to systems and methods for verifying authorized postage security devices.

BACKGROUND OF THE INVENTION

The Information-Based Indicia Program (IBIP) is a distributed trusted system proposed by the United States Postal Service (USPS). The IBIP is expected to support new methods of applying postage in addition to, and eventually in lieu of, the current approach, which typically relies on a postage meter to mechanically print indicia on mailpieces. The IBIP requires printing large, high density, two dimensional (2-D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

The user infrastructure, which resides at the user's site, comprises a postage security device (PSD) coupled to a host system. The PSD is a secure processor-based accounting device that dispenses and accounts for postal value stored therein. The host system may be a personal computer (PC) or a meter-based host processor. Among the various requirements set forth in the Host System Specification is that the host system verifies that the coupled PSD is "the expected PSD". Conventional postage metering devices and recent digital metering devices, such as PostPerfect and Personal Post Office, both manufactured by the assignee of the present invention, do not include such verification. Thus, a method for achieving such verification is desired.

U.S. Pat. No. 5,510,992 discloses a method whereby the host PC verifies that a storage means that is coupled to the host PC and has postal value stored therein, is authorized for use with the host PC. The method comprises the steps of storing a unique identifier, such as a serial number, in the storage means when the storage means is filled with postal value, and sending the unique identifier to the host PC when postage value is requested for dispensing. The host PC then verifies that the storage means is authorized for use with the host PC by confirming that the unique identifier retrieved from the storage device is the same as one stored in the host PC. Although such method verifies that the storage means is the expected storage device, the storage means is not a PSD because it is not a processor-based accounting device that dispenses and accounts for postal value stored therein. Furthermore, the verification of the serial number in the host PC is subject to fraud.

U.S. Pat. No. 4,802,218 discloses a card automated transaction system in which a terminal and a smart card complete a predetermined handshake procedure to initiate each transaction. The card automated transaction system employs a card having a secure, resident microprocessor which operates to confirm that a requested transaction is authorized and to then initiate an interactive handshake recognition procedure with a resident microprocessor in a value dispensing section of an automated terminal. The handshake recognition procedure includes the card microprocessor generating a number which is encrypted in the card and then sent to the dispensing section microprocessor. The dispensing section microprocessor decrypts this number, re-encrypts it and transmits it back to the card microprocessor where it is further processed. Upon completion of the handshake procedure, the card microprocessor and the dispensing section microprocessor simultaneously actuate the dispensing of the requested item of value and the debiting of such value from a balance stored on the card.

SUMMARY OF THE INVENTION

It has been found that the present invention provides a more secure and reliable system and method for verifying the expected PSD is coupled to the host PC. It has further been found that the present invention provides a secure and reliable system and method for verifying the expected host PC is coupled to the PSD.

The present invention provides a method for verifying that a host system is the expected host system once the PSD has been verified as the expected PSD. In accordance with the present invention, a first message is encrypted in the PSD using a first cryptographic key to obtain a first encrypted message. The first encrypted message is sent to the host system which decrypts the first encrypted message using a second cryptographic key. The host system then encrypts a second message derived from the decrypted first encrypted message using the second cryptographic key. The host system then sends the encrypted second message to the PSD which decrypts the second encrypted message in the PSD using the first cryptographic key. The PSD compares the decrypted second encrypted message with the first message, and activates the PSD for processing transactions requested by the host system when the decrypted second encrypted message corresponds to the first message.

The present invention further provides alternate embodiments secure and reliable methods for verifying in the host system that the expected PSD is coupled to the host system. In one embodiment, a message, such as a random number, is generated in the Host system and sent to the PSD. In one embodiment, the PSD encrypts the number and transmits it to the Host system. The Host system decrypts the encrypted number and ensures it corresponds with the number originally generated and transmitted to the PSD. In an alternate embodiment, the random number is signed in the PSD. The signed number is transmitted to the Host where the signature is verified. The generated message may include data indicating status of the PSD based, for example a checksum of PSD transaction records stored in the host system.

In yet another embodiment, the PSD has a private key which is associated with a specific public key that is stored in the host PC. The host PC sends the PSD public key to the PSD. If the PSD determines that the received PSD public key corresponds to its private key, the system has determined that the expected PSD is connected to the Host system and the PSD is activated to accept postal value requests from the host PC. Additionally, a PSD state identification, such as a checksum of a PSD transaction log file stored in the host may be verified by the PSD, which also has stored therein a PSD transaction log file. In this manner the PSD verifies that the PSD has performed all transactions with the host PC sending the checksum.

In another embodiment, a random number is generated in the host system and encrypted with a PSD state identification number. The encrypted random number is then sent to the PSD. The PSD decrypts the encrypted random number received using the PSD state identification number and sends the decrypted random number to the host system. The host system compares the decrypted random number received from the PSD to the random number generated in the host system. If they are the same, the host system has verified the expected PSD and has also verified that the PSD has not completed any transactions apart from the host system.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
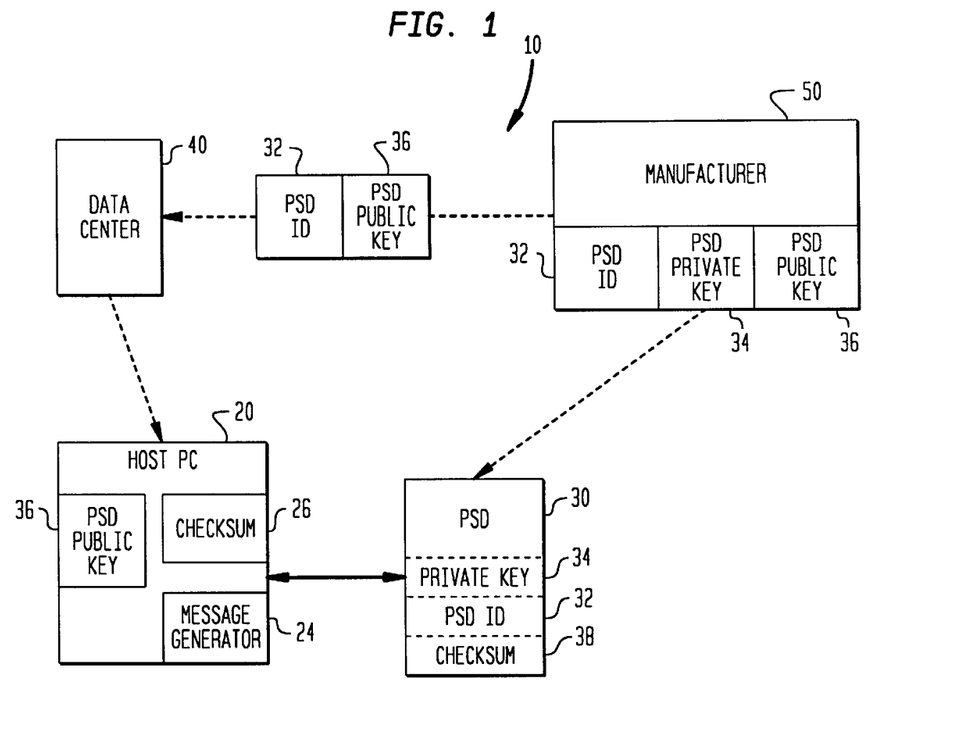
FIG. 1 is a block diagram of a postage metering system in accordance with the present invention showing a process for storing keys in a host system and a PSD coupled thereto.

In describing the present invention, reference is made to the drawings, wherein there is seen system and methods for verifying the expected postage security device in a host system and conversely verifying the expected host system. Referring now to FIG. 1, a postage metering system, generally designated 10, includes a Host PC 20 coupled to a PSD 30, a Data Center 40 and a manufacturer 50. The manufacturer 50 initializes PSD with an identification number, such as PSD ID 32, and a cryptographic key, such as PSD private key 34. The manufacturer 50 also sends the PSD ID 32 and a cryptographic key corresponding to the key in the PSD 30, such as PSD public key 36, to the Data Center 40. The Data Center 40 then sends the PSD ID 32 and the public key 36, to the Host PC 20. For the purpose of describing the present invention, the PSD private and public keys are stored in PSD 30 and Host PC 20 respectively. It will be understood that a secret key shared by the Host PC and the PSD may be used in place of such key pair.

The Host PC 20 and PSD 30 each include a microprocessor and memory (not shown). The Host PC 20 further includes a message generator 24 for generating a message. The message may be a random number or may include data indicating status of the PSD, for example a checksum 26 of PSD transaction records stored a log files in Host PC 20. For the following description of the present invention checksums will be used. The PSD records stored in Host PC 20 correspond to PSD records stored in PSD 30 for each transaction by PSD 30. For a more detailed description of such storage of PSD records see U.S. patent application Ser. No. 08/574,743, filed Dec. 19, 1995 and assigned to the assignee of the present invention, which incorporated herein by reference.

Figure 2:
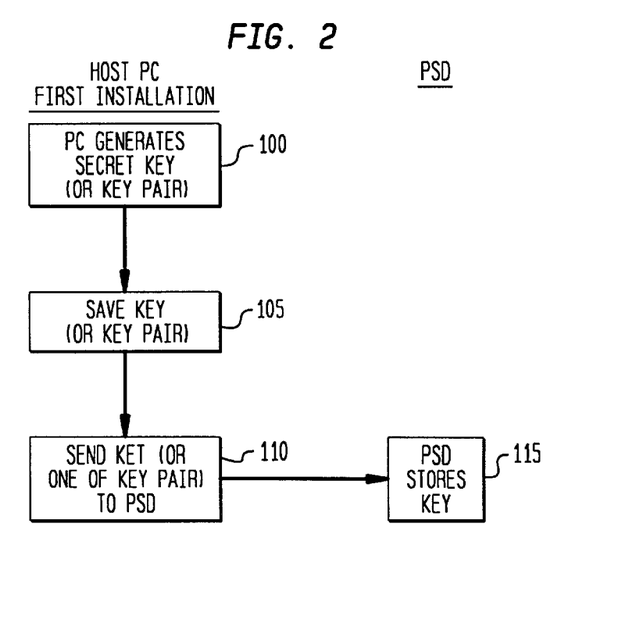
FIG. 2 is a flow chart showing an alternate process for storing keys in a host system and a PSD coupled thereto.

Referring now to FIG. 2, an alternate method for initializing the PSD with a cryptographic key is shown. At step 100, Host PC 20 generates a secret key or a key pair. The key or key pair is stored in Host PC 20, at step 105. Host PC 20 the sends the secret key or one of the keys of the key pair to PSD 30, at step 110. PSD 30 stores the key received from Host PC 20, at step 115.

Figure 3:
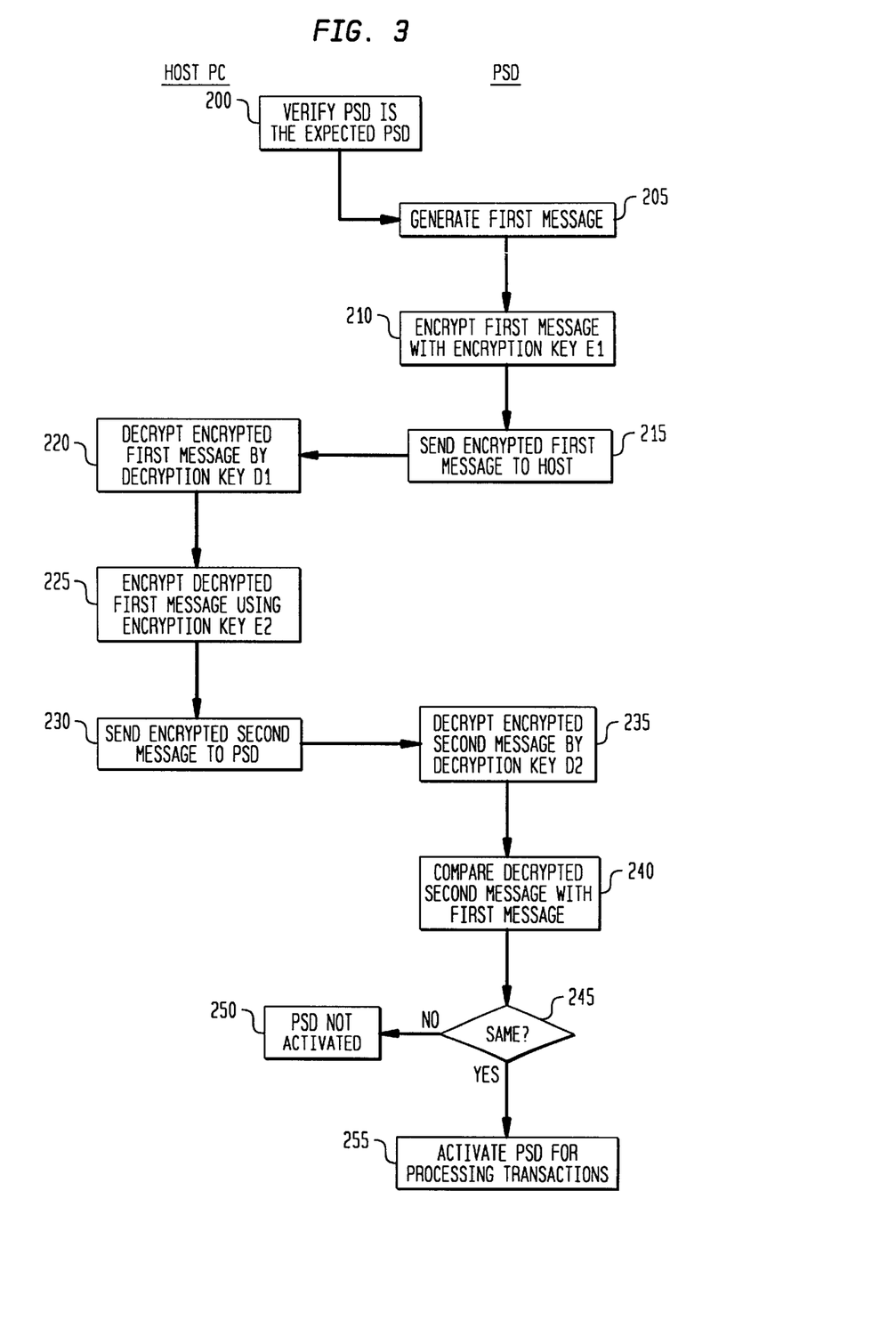
FIG. 3 is a flow chart of method for verifying the expected postage security device and an authorized host system in accordance with the present invention.

Referring now to FIG. 3, a method for verifying the expected postage security device and an authorized host system is shown. At step 200, the PSD is verified as the expected PSD. This step is described in more detail below. Once the PSD is verified as the expected PSD, the PSD, at step 205, generates a first message. The first message may be a random number or may include data indicating status of the PSD based, for example a checksum of PSD transaction records stored as log files in Host PC 20. At step 210, the PSD encrypts the first message with a first encryption key E1 stored in the PSD. In the preferred embodiment, the encryption key is the PSD private key of a key pair assigned to the PSD at the time of manufacture. Alternatively, the encryption key can be the public key of a key pair or a secret key shared with the Host PC. At step 215, the PSD sends the encrypted first message to the Host PC.

At step 220, the Host PC decrypts the encrypted first message using a first decryption key D1, which is preferably the public key of E1, but may be the shared secret key E1. The Host PC then, at step 225, encrypts the decrypted first message using a second encryption key E2 to obtain a second encrypted message. In the preferred embodiment, the encryption key is the Host PC private key of a key pair. Alternatively, the encryption key can be the public key of a key pair or a second secret key shared with the PSD. At step 230, the Host PC sends the second encrypted message to the PSD.

At step 235, the PSD decrypts the encrypted second message using a second decryption key D2. At step 240, the PSD compares the decrypted second message with the first message. If not the same, at step 245, then the PSD is not activated for transactions, at step 250. If the same, at step 255, the completed handshake verifies that the Host PC and PSD are the expected host and PSD and are authorized for processing transactions.

As described above, at step 200, the present invention verifies the PSD is the expected PSD. The following are alternate embodiments for performing such verification in the Host PC or the PSD.

Figure 4:
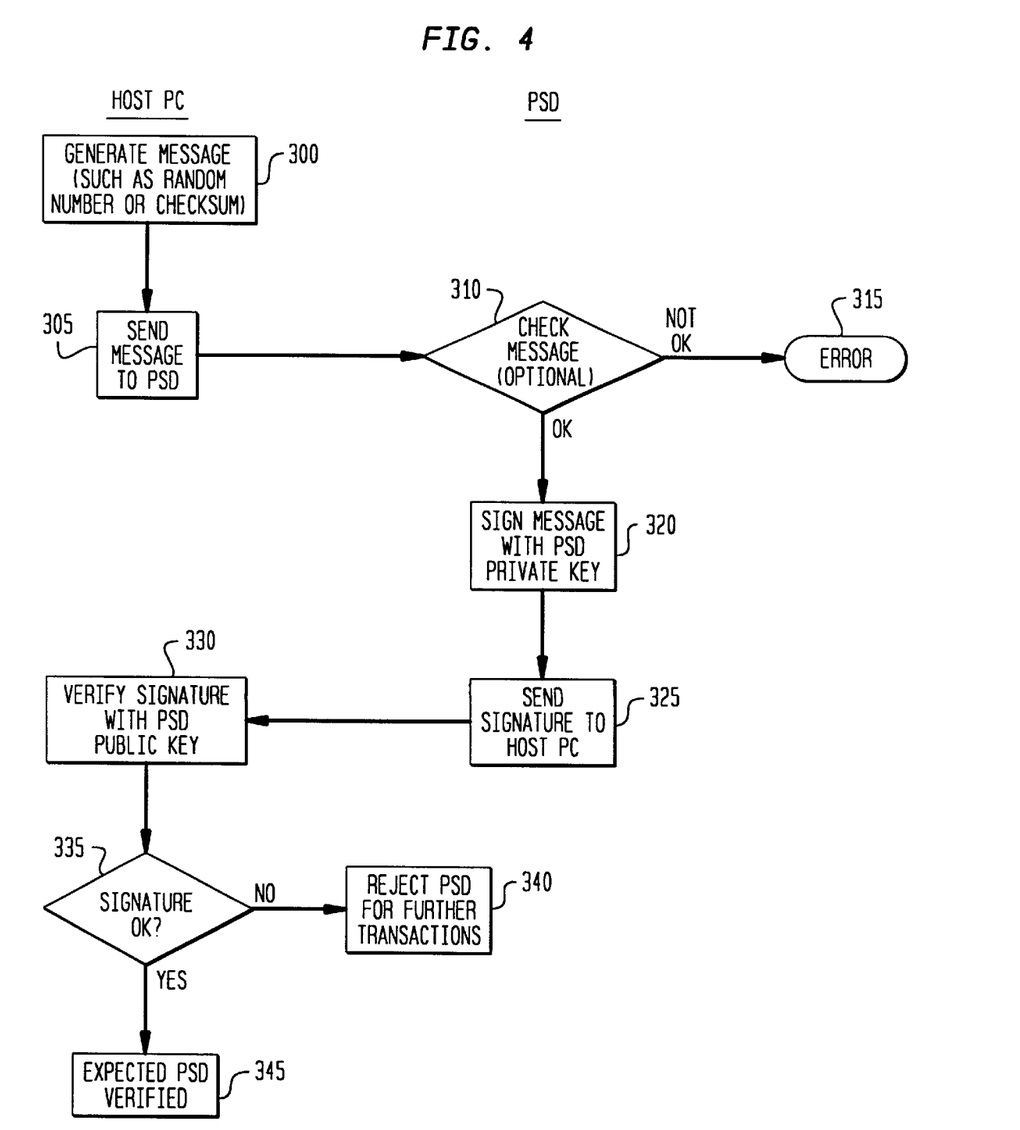
FIG. 4 is a flow chart of one method for verifying the expected PSD is coupled to the host system.

Referring now to FIG. 4, a method is shown for verifying in Host PC 20 that the expected PSD is coupled thereto. At step 300, the Host PC generates a message. In accordance with the present invention, the message may be in the form of a random number or may be a checksum of a PSD transaction log stored in the Host PC. The Host PC, at step 305, sends the message to the PSD. If a checksum has been sent, the at step 310, the PSD compares the message received with a checksum of a PSD transaction log stored in the PSD. If the checksum received is not the same as the checksum of the PSD transaction log, then an error is flagged, at step 315, indicating that there is a discrepancy between the PSD logs stored in the Host PC and the PSD. If the checksums are the same or if the message is a random number, at step 320, the PSD signs the message with the PSD private key. At step 325, the PSD sends the signed message to the Host PC.

At step 330, the Host PC verifies the signature using the PSD public key stored in the Host PC. If the signature is not verified at step 335, the Host PC rejects the PSD from processing any further transactions, at step 340. If the signature is verified, at step 345, the expected PSD has been verified and the Host PC can begin request postal value from the PSD. It will be understood by those skilled in the art that other cryptographic processing, such as encryption or hashing may be used in place of signing.

Figure 5:
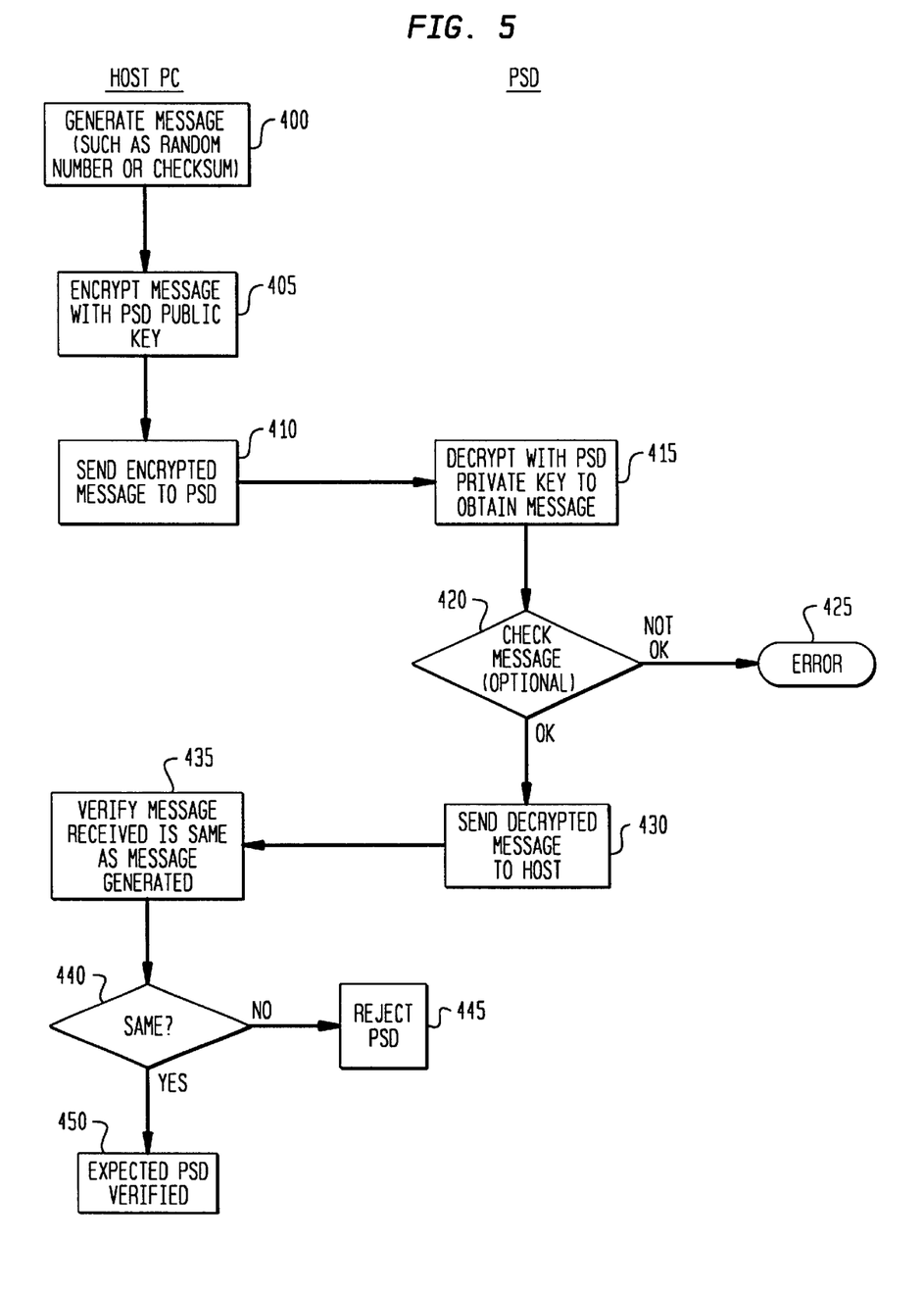
FIG. 5 is a flow chart of an alternate method for verifying the expected PSD is coupled to the host system.

Referring now to FIG. 5, an alternate method for verifying the expected PSD is shown. At step 400, the Host PC generates a message, such as a random number or a checksum 26 of a PSD transaction log stored in the Host PC. The Host PC encrypts the message with the PSD public Key, at step 405, and sends the message to the PSD, at step 410. At step 415, the PSD decrypts the encrypted message received. If a checksum has been sent then, at step 420, the PSD compares the message received with a checksum of a PSD transaction log stored in the PSD. If the checksum received is not the same as the checksum of the PSD transaction log, then an error is flagged, at step 425, indicating that there is a discrepancy between the PSD logs stored in the Host PC and the PSD. If the checksums are the same or if the message is a random number, at step 430, the PSD sends the decrypted message to the Host PC.

At step 435, the Host PC verifies that the message received from the PSD is the same as the message generated in the Host PC. If not the same at step 440, the Host PC rejects the PSD from processing any further transactions, at step 445. If the message received from the PSD is the same as the message generated in the Host PC, at step 450, the expected PSD has been verified and the Host PC can begin request postal value from the PSD.

Figure 6:
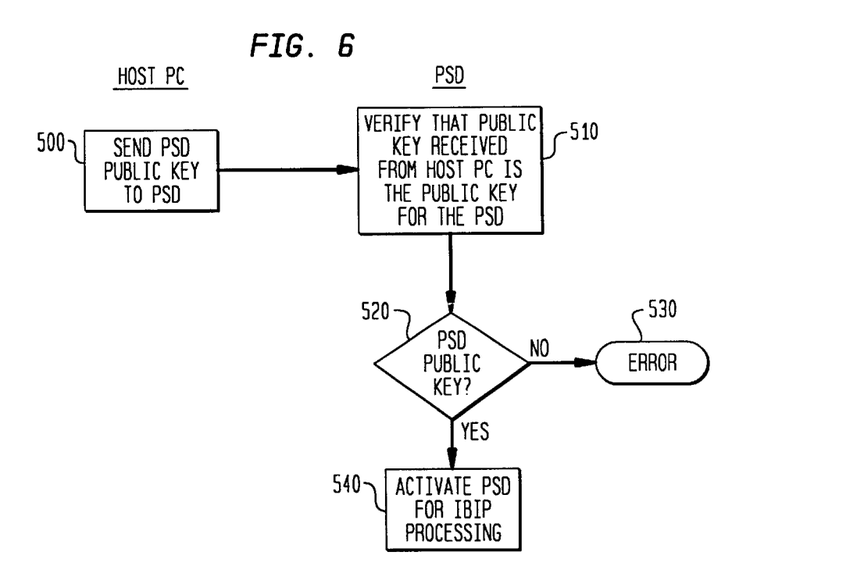
FIG. 6 is a flow chart of a alternate method for verifying the expected PSD is coupled to the host system.

Referring now to FIG. 6, another alternate method is shown for verifying that the expected PSD is coupled Host PC 20. At step 500, the Host PC sends the PSD public key stored in the Host PC to the PSD. At step 510, the PSD determines if the public key received is the public key corresponding to the PSD private key stored in the PSD. If not, then, at step 530, an error is flagged that the expected PSD is not coupled to the Host PC. If the public key received does correspond to the PSD private key in PSD 30, then, at step 540, the expected PSD has been verified and the PSD is activated for IBIP processing.

Figure 7:
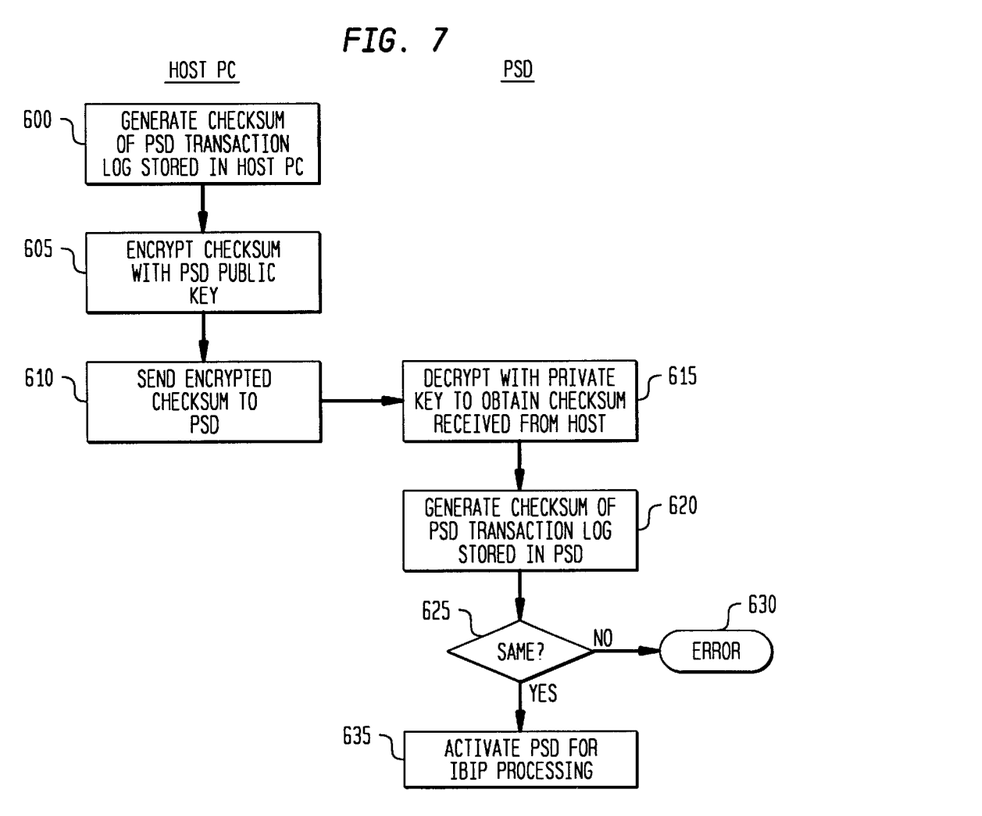
FIG. 7 is a flow chart of an alternate method for verifying the expected PSD is coupled to the host system.

Referring now to FIG. 7, yet another alternate method for verifying the expected PSD is shown. At step 600, the Host PC generates a message. In accordance with the present invention, the message may be in the form of a checksum of a PSD transaction log stored in the Host PC or any other PSD state identification that corresponds to data also stored in the PSD. The Host PC encrypts the message with the PSD public Key, at step 605, and sends the message to the PSD, at step 610. At step 615, the PSD decrypts the received encrypted message, such as the checksum. At step 620, the PSD generates a checksum of the transaction log stored in the PSD (or other PSD state identification corresponding to the message generated by the Host PC). At step 625, the PSD compares the decrypted checksum received with the checksum generated by the PSD. If the checksums are not the same, then an error is flagged, at step 630, indicating that there is a discrepancy between the PSD logs stored in the Host PC and the PSD. If the checksums are the same then, at step 635, the PSD is activated for IBIP processing.

Figure 8:
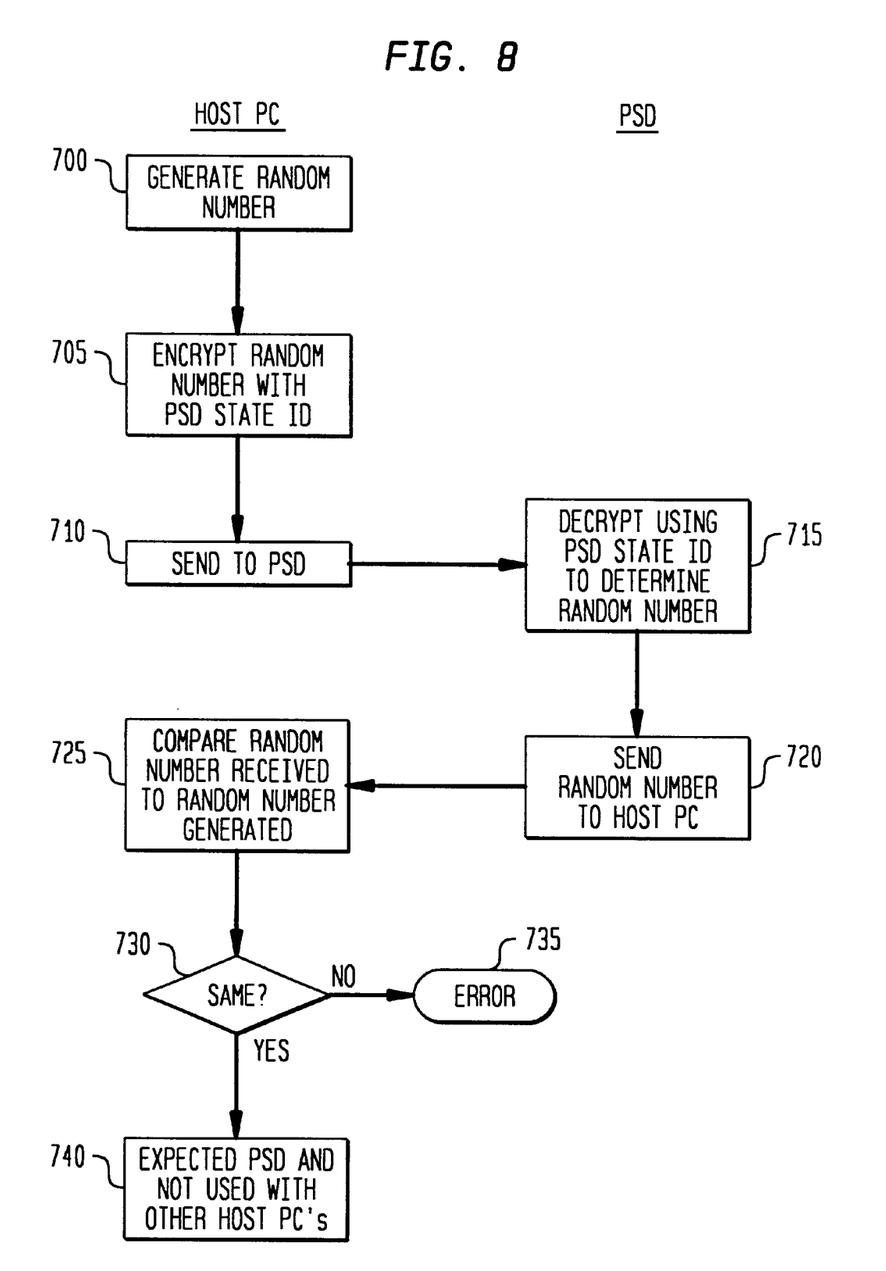
FIG. 8 is a flow chart of a preferred method for verifying the expected PSD is coupled to the host system.

Referring now to FIG. 8, another method is shown for verifying in Host PC 20 that the expected PSD is coupled thereto. At step 700, the Host PC generates a random number which is then encrypted, at step 705, with a PSD state identification number or data. In the preferred embodiment of the present invention, the PSD state identification number or data represents a predetermined status of the PSD after the previous transaction between the Host PC and the PSD. For example, the PSD state identification number or data may be a checksum of the PSD transaction logs or the last random number generated for the purpose of verifying the PSD. At step 710, the encrypted random number is sent to the PSD. At step 715, the PSD decrypts the encrypted random number received from the Host PC using the same PSD state identification number or data that was used by the Host PC. At step 720, the PSD sends the decrypted random number to the Host PC.

At step 725, the Host PC verifies that the random number received from the PSD is the same as the random number generated in the Host PC. If not the same at step 730, the Host PC flags an error and rejects the PSD from processing any further transactions, at step 735. If the random number received from the PSD is the same as the random number generated in the Host PC, at step 740, the Host PC has verified that the expected PSD is coupled to the Host PC and has not processed any transactions apart from the Host PC. Thus, the Host PC can begin request postal value from the PSD.

It has been found that the present invention is suitable for use with any security device that is coupled to a host system in an unsecured manner. For example, the present invention could be used for a certificate metering system such as disclosed in U.S. patent application Ser. No. 08/518,404, filed Aug. 21, 1995, assigned to the assignee of the present invention, and incorporated herein by reference.

While the present invention has been disclosed and described with reference to specific embodiments thereof, it will be apparent, as noted above, that variations and modifications may be made therein. It is, thus, intended in the following claims to cover each variation and modification, including a certificate metering system, that falls within the true spirit and scope of the present invention.

What is claimed is:

1. A method verifying that a host system and a postage security device (PSD) coupled thereto are authorized to dispense postal value, the method comprising the steps of:

verifying that the PSD is the expected PSD;

encrypting a first message in the PSD using a first cryptographic key to obtain a first encrypted message;

sending the first encrypted message to the host system;

decrypting the first encrypted message in the host system using a second cryptographic key;

encrypting in the host system a second message derived from the decrypted first encrypted message using the second cryptographic key to obtain a second encrypted message;

sending the encrypted second message to the PSD;

decrypting the second encrypted message in the PSD using the first cryptographic key;

comparing the decrypted second encrypted message with the first message; and activating the PSD for processing transactions requested by the host system when the decrypted second encrypted message corresponds to the first message, wherein the step of verifying that the PSD is the expected PSD comprises the steps of:

generating a third message in the host system, said third message including at least first transaction dependent data from a first transaction record stored in the host system during the last transaction between the host system and the PSD, said first transaction dependent data changing for each transaction between the host system and any PSD;

encrypting the third message with an encryption key stored in the host system;

sending the encrypted third message to the PSD;

decrypting the encrypted third message with a decryption key stored in the PSD to obtain the first transaction dependent data; and comparing in the PSD the first transaction dependent data to second transaction dependent data from a second transaction record stored in the PSD, said second transaction dependent data changing for each transaction between any host system and the PSD.

2. The method of claim 1 wherein the first message is a random number.

3. The method of claim 1 comprising the further steps of:

generating the first message in the host system; and sending the first message to the PSD.

4. The method of claim 1 wherein the first and second cryptographic keys are a public key pair.

5. The method of claim 1 wherein the second message is the decrypted first encrypted message and the PSD is activated when the decrypted second message is the same as the first message.

6. A method for verifying that a host system and a postage security device (PSD) coupled thereto are authorized to dispense postal value, the method comprising the steps of:

verifying that the PSD is the expected PSD;

encrypting a first message in the PSD using a first cryptographic key to obtain a first encrypted message;

sending the first encrypted message to the host system;

decrypting the first encrypted message in the host system using a second cryptographic key;

encrypting in the host system a second message derived from the decrypted first encrypted message using the second cryptographic key to obtain a second encrypted message;

sending the encrypted second message to the PSD;

decrypting the second encrypted message in the PSD using the first cryptographic key;

comparing the decrypted second encrypted message with the first message; and activating the PSD for processing transactions requested by the host system when the decrypted second encrypted message corresponds to the first message, wherein the step of verifying that the PSD is the expected PSD comprises the further steps of:

generating a third message in the host system;

encrypting the third message with first transaction dependent data from a first transaction record stored in the host system during the last transaction between the host system and the PSD, said first transaction dependent data changing for each transaction between the host system and any PSD;

sending the encrypted third message to the PSD;

decrypting the encrypted third message with second transaction dependent data from a second transaction record stored in the PSD, said second transaction dependent data changing for each transaction between any host system and the PSD;

sending the decrypted third message to the host system; and verifying in the host system that the decrypted third message is the same as the generated third message.

7. The method of claim 6 wherein the first message is a random number.

8. The method of claim 6 comprising the further steps of:

generating the first message in the host system; and sending the first message to the PSD.

9. The method of claim 6 wherein the first and second cryptographic keys are a public key pair.

10. The method of claim 6 wherein the second message is the decrypted first encrypted message and the PSD is activated when the decrypted second message is the same as the first message.

11. A method for verifying that a host system and an postage security device (PSD) coupled thereto are authorized to dispense postal value, the method comprising the steps of:

generating a first random number in the host system;

encrypting the first random number with a PSD status identification number, said PSD identification status number changing for each transaction between the host and the PSD, and wherein the PSD status identification number is a second random number generated during the last verification of the host system and the PSD as being authorized to dispense postal value;

sending the encrypted random number to the PSD;

decrypting the encrypted random number in the PSD to obtain a decrypted random number;

sending the decrypted random number to the host system;

comparing in the host system the decrypted random number to the first random number; and verifying that the host system and the PSD are authorized to dispense postal value when the first random number matches the decrypted random number.

12. The method of claim 11 wherein the PSD status identification number is transaction dependent data from a transaction record stored in the host system during the last transaction between the host system and the PSD.

* * * * *